Figure 1:
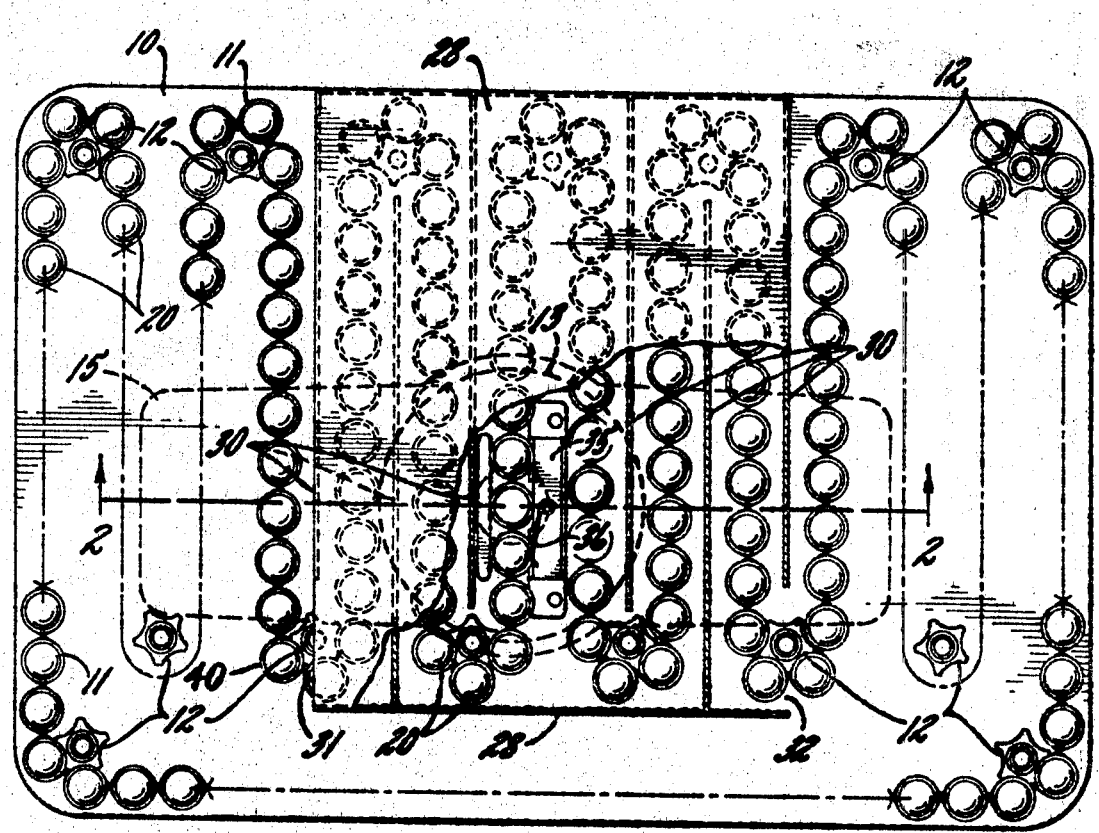

United States Patent

[11] 3,553,454

| [72] | Inventors | Robert E. Olson<br>Glen Ellyn;<br>Roy E. Smith, Villa Park, Ill. |
|---|---|---|
| [21] | Appl. No. | 681,451 |
| [22] | Filed | Nov. 7, 1967 |
| [45] | Patented | Jan. 5, 1971 |
| [73] | Assignee | Packard Instrument Company, Inc.<br>Downers Grove, Ill.<br>a corporation of Delaware |

[54] LABYRINTH LIGHT SEAL SYSTEM FOR A LIQUID SCINTILLATION COUNTING APPARATUS SAMPLE CHANGING MECHANISM
5 Claims, 2 Drawing Figs.

[52] U.S. Cl........................................................ 250/71.5,
250/106
[51] Int. Cl......................................................G01j 39/18,
G01t 1/20

[50] Field of Search........................................... 250/71.5,
106SC; 214/16B

[56]        References Cited
UNITED STATES PATENTS

| 3,187,182 | 6/1965 | Fratantuno.................... | 250/106 |
| 3,270,202 | 8/1966 | Long et al..................... | 250/71.5 |

*Primary Examiner*—Archie R. Borchelt
*Assistant Examiner*—Davis L. Willis
*Attorney*—Wolfe, Hubbard, Leydig, Voit & Osann

ABSTRACT: A light seal for a liquid scintillation counting apparatus sample changing mechanism is described in which a continuous sample conveyor feeding the counting chamber of the apparatus is disposed in a serpentine path within a light-tight tunnel enclosing a load-unload station.

PATENTED JAN 5 1971  3,553,454

INVENTORS.
ROY E. SMITH
ROBERT E. OLSON
BY
Wolfe, Hubbard, Voit & Osann
ATTORNEYS.

LABYRINTH LIGHT SEAL SYSTEM FOR A LIQUID SCINTILLATION COUNTING APPARATUS SAMPLE CHANGING MECHANISM

This invention relates to liquid scintillation systems for radiation measurements. In particular, it relates to such apparatus having automatic sample changing means including a sample elevator which shifts a sample vial between a load-unload station and an inner counting chamber wherein light flashes or scintillations within the sample are detected and counted.

Liquid scintillation counters in modern radiation technology are increasingly becoming more refined to keep pace with their increasing use. Among the improvements which have appeared is an automatic sample changing mechanism which eliminates the need for an operator to manually insert and withdraw each sample to be counted. Such mechanisms can be automatically programmed to perform numerous counting functions, including repetitive counting in the the presence of external or internal radiation standards, and special purpose programs which count samples in a particular order or for varying periods of time.

A difficulty in such sample changing mechanisms arises from the need to absolutely exclude all ambient light from the counting chamber. Because the function of the scintillation counting apparatus is to detect minute light flashes or scintillations in a sample vial containing a liquid scintillator, the presence of a spurious light source will disrupt the counting process and may even damage the photomultiplier tubes of the counting apparatus. For this reason it is important to provide positive light seals which will prevent the entry of ambient light into the counting chamber during counting. In order to eliminate the need to interrupt the operation of the photomultiplier tubes during sample changing, it is also desirable to maintain the light seal during the process of changing the samples to be counted. If this is not done, the voltage at the photomultiplier tube must instead be cut off each time a sample is changed in the counting chamber.

Existing light seals for automatic sample changing mechanisms have generally utilized a sliding O-ring type of seal in a cylindrical bore containing the sample elevator. The seal on such mechanisms must be maintained both above and below the counting chamber in order to prevent the entry of extraneous light. When the elevator of such a mechanism is fully extended to receive a sample, a seal must be provided both above and below the counting chamber region to prevent entry of light in this position. When the elevator is then lowered to carry a sample into the counting chamber, the O-ring type seal is utilized to exclude light below the counting chamber, while a shutter arrangement is utilized to cut off the entry of light through the open elevator bore above the chamber.

Such an arrangement gives rise to several disadvantages. First, the O-ring seals are not entirely satisfactory because of the rubbing and wear which they produce, and because of the light flashes which they can cause due to the accumulation of static charges caused by friction on the walls of the elevator bore. Other difficulties may arise in the shutter, which is necessarily a relatively complex and delicate mechanism and is prone to the various malfunctions common to such apparatus. Another difficulty is that the use of a separate mechanical shutter in conjunction with sliding O-ring type seals on the elevator shaft requires a system of electrical or mechanical interlocks to insure that the apparatus functions according to the required sequence for automatic operation. Such interlocks and associated equipment are necessarily complex, expensive, and add an additional source of potential trouble to an already complicated piece of apparatus.

Yet another difficulty with the foregoing apparatus is that two O-ring type seals are required, one above and one below the counting chamber when the elevator is in the extended position to receive a new sample. This requires an increased total length of the elevator mechanism to accommodate both seals below the counting chamber when the elevator is lowered to place the sample in counting position. The mechanism thus extends well below the counting chamber, and often requires that the elevator shaft and associated equipment protrude a considerable length beyond the exterior of the counting mechanism itself.

When improved elevator shaft seals of the expandable type are used, the operation of the apparatus is improved to the extent that excess friction and generation of static electricity is minimized. However, there is also a corresponding increase in the complexity and cost of the apparatus and a requirement to mechanically expand and contract the seals in connection with the operation of shutter interlocks, and the overhead shutter necessarily makes the operation of the machine more complicated and slows down the automatic counting of numerous samples.

In view of the foregoing, it is a principal objective of the present invention to provide a simplified and less expensive means of providing a light seal for a liquid scintillation counting apparatus which eliminates the need for complex sliding seals, overhead shutters and interlocks between them. It is contemplated that the invention will allow the use of a separate bolt-on conveyor mechanism for use with an automatic sample changing apparatus in the scintillation counter, and that the seal will require no mechanical interconnections between the sample elevator or other internal seals within the counting apparatus itself.

The invention is intended to provide a light seal having no moving parts, which is immune to extremes of temperature and humidity which are sometimes required in certain types of research programs, and which provides easy access for cleaning and maintenance. It is further intended that the apparatus of the invention by adaptable for use with existing systems which provide for mechanical centering apparatus for the sample vials as they are counted.

Figure 2:
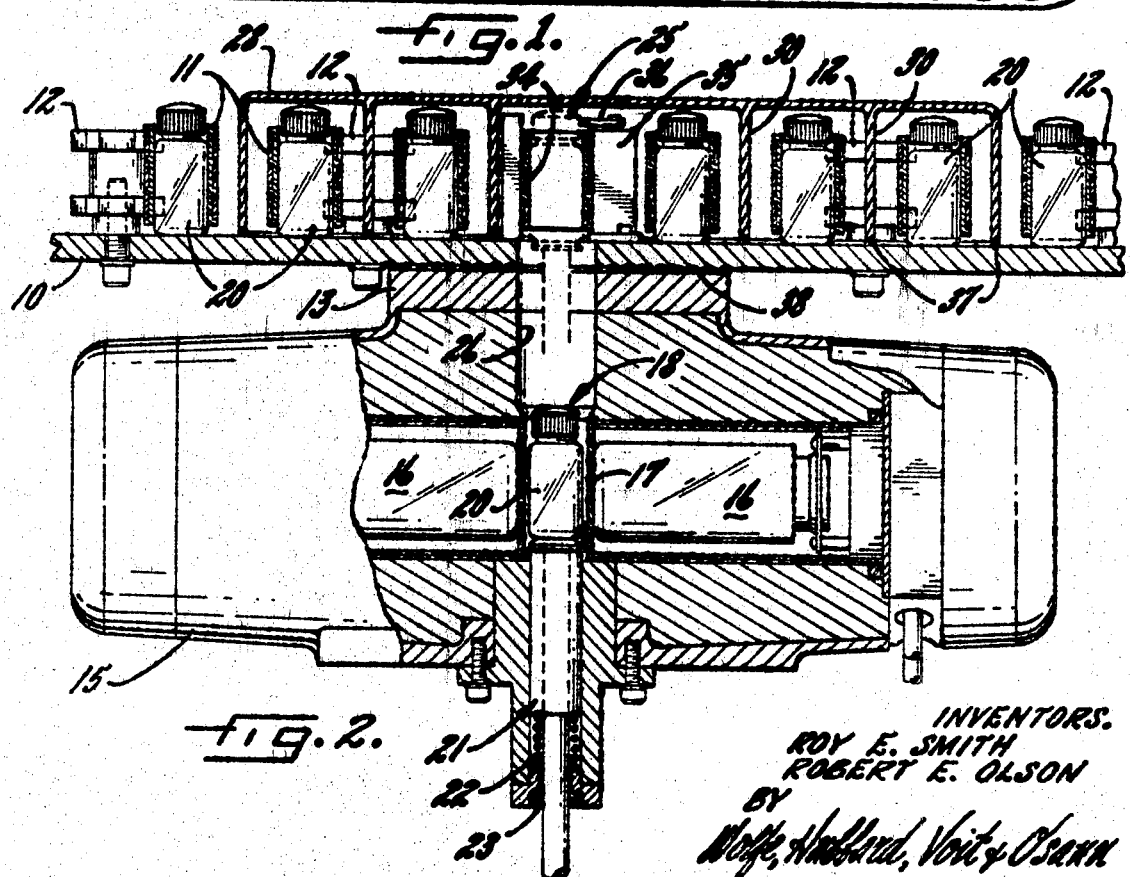

Other objects and advantages of the invention will become apparent upon reading the following detailed description and upon reference to the drawings, in which:

FIG. 1 is a plan view of a sample changing mechanism having a labyrinth light seal constructed according to the present invention, with a portion of the labyrinth broken away; and FIG. 2 is an elevation of the structure of FIG. 1 in partial section, illustrating the relationship of the labyrinth to the sample elevator and counting chamber.

While the invention will be described in connection with a particular preferred embodiment, it will be understood that it is not intended to so limit the invention but is instead intended to cover all alternative and equivalent constructions as may be included within the spirit and scope of the invention as defined by the appended claims.

In the drawings, there is shown in FIG. 1 a sample feeder table 10 equipped with an endless chain conveyor system comprising a plurality of articulated lengths 11 strung in a convoluted path about a plurality of drive sprockets 12. The table 10 is carried by a mounting boss 13 on the upper surface of a casing 15 which surrounds and protects the scintillation counting apparatus contained within. The table 10 is secured to the casing 15 by bolts (not shown) or other suitable means.

The scintillation detection and counting mechanism within the casing 15 consists essentially of a pair of photomultiplier tubes 16 disposed in a face-to-face relationship and separated by a block of light transmissive material 17 having a central bore which defines a counting chamber 18. The samples to be counted consist of a radioactive substance mixed with a photolumenescent liquid substance known as a scintillator, and contained in a sample vial 20. The radioactive decay of the substance to be analyzed appears as minute flashes or scintillations in the scintillator liquid within the vial, and these are then picked up and amplified by the photomulitplier tube 16 to form an electrical output signal. The signal may be carried to other electronic equipment (not shown) which is used to analyze and count the individual scintillations from the sample then under investigation.

The sample vial 20 is moved in and out of the counting chamber 18 by a sample changing means which includes a sample elevator 21, a counterbalancing spring 22, and a resilient light seal 23. The elevator 21 is actuated by power means (not shown) between a lowered position in which the sample vial 20 is positioned within the counting chamber 18, and a raised position in which the vial is moved out of the counting chamber, raised above the casing 15, and presented at a load-unload station 25 generally in the plane of the sample table 10. The lower portion of the elevator 21 moves with a sliding fit within the resilient light seal 23, which is preferably made of a resilient plastic material. The combination of the tight fit of the seal 23 and the absence of straight line light paths in the lower portion of the sample changing means eliminates the possibility of light leaks from this source. Between the counting chamber 18 and the load-unload station 25 there is simply an open elevator shaft 26. No sliding seals or other complicated light trap mechanism is necessary in this region because of the provision of the labyrinth seal of the present invention.

According to the invention, a light seal is provided which eliminates the leakage of ambient light into the region of the load-unload station 25 and the counting chamber 18. This is accomplished by providing a labyrinth cover 28 which is lighttight and overlies the path of the articulated sample indexing chain in the region of the load-unload station 25. It may be seen from FIG. 1 that the sample indexing chain is laid out in a series of convoluted folds in order to accommodate a large number of sample vials 20 in the space provided on the feeder table 10. The load-unload station 25 is then disposed generally in the center of the table 10 so that at least two or three such folds lie on either side of the load-unload station which, of course, directly overlies the sample counting chamber and is connected thereto by the straight path of the elevator shaft 26 which has no further light trapping or sealing means.

The labyrinth cover 28 is formed with a plurality of staggered tunnel defining internal panels 30. Each panel 30 is disposed in a position separating two adjacent folds of the sample conveyor chain, with the panel terminating at a point where the chain reverses direction about a sprocket 12. In this way the plurality of sprockets 12 define a serpentine path along which the conveyor chain is transferred, and the path defined by the chain is closely followed by the tunnel sections of the labyrinth cover 28.

At one side of the cover 28 is an entrance opening 31 which is exposed to ambient light. As may be best seen in FIG. 1, the conveyor chain passes through two complete tunnel segments and a part of a third before reaching the load-unload station 25 near the midpoint of the area enclosed by the labyrinth cover 28. As the conveyor chain leaves the load-unload station 25, it may again be seen from the drawings of the illustrative embodiment that the chain passes through a like number of tunnel segments before reaching an exit opening 32 at the other side. By this technique all straight line light paths between either the entrance opening 31 or the exit opening 32 and the load-unload station 25 are completely blocked by two or more of the path defining panels 30.

Within the covered portion of the table 10 and adjacent the load-unload station are control means for detecting the presence of a sample vial 20 as it passes, being conveyed by an articulated link 11 of the sample conveyor chain. Each articulated link 11 contains a central bore 34 which defines a cavity adapted to receive and carry a sample vial 20 as the chain moves along the surface of the feeder table 10. One or more the sprockets 12 is driven by a motor (not shown) to move the chain along the serpentine path defined by the individual sprockets and through the tunnel defined by the labyrinth cover 28. This sample indexing means is then controlled by a switch assembly 35 located adjacent the load-unload station 25. Switch contacts 36 extend from the switch assembly 35 and serve to detect the presence or absence of a sample vial 20 from the next cavity defining link 11 in the chain. A suitable control system (not shown) may then be used to incrementally advance the chain by one link at a time, thus positioning the next sample vial 20 in the load-unload station from which it may be withdrawn into the counting chamber 18 by the sample elevator 21. When the counting of each particular sample is completed, the sample vial 20 is returned to its link 11 and the chain is advanced one link further or until a link 11 is encountered containing the next sample vial 20.

As a further feature of the invention, the internal surfaces of the labyrinth cover 28, including the individual path defining panels 30, are preferably coated with a light absorbent coating or paint. This further enhances the light excluding features of the invention, and makes even more sure that ambient light is prevented from leaking into the region of the load-unload station from which it might then enter the counting chamber and disrupt the counting process. Such a coating may be formed through the use of a flat or nonglossy black paint, for example. The switch assembly 35 and elevator shaft 26 are also provided with a light absorbing coating.

Although the labyrinth cover 28 is effective to block ambient light, it will be remembered that each sample vial 20 containing a radioactive substance is itself a weak but significant source of light scintillations. While invisible to the naked eye, these tiny flashes are sufficient to be detected by the photomultiplier tubes 16. For this reason the bore 34 of each sample carrying articulated link 11 is also provided with an opaque light absorbing coating similar to that of the inner surfaces of the labyrinth cover 28 and the elevator shaft 26.

To further increase the sealing ability of the labyrinth light seal, a resilient gasket means 37 is provided between the edges of the labyrinth cover 28 and the path defining panels 30 where they contact the separation plane at the surface of the feeder table 10. Such a gasket may be of rubber, flexible plastic, or other suitable material. It is preferably applied to the mating surfaces of the labyrinth cover 28 with adhesive, so that the entire cover may be removed for access to the internal portions of the apparatus without disturbing the sealing means 37. A similar seal 38 is also used between the mounting boss 13 of the casing 15 and the underside of the feeder table 10.

Besides providing an efficient light seal for the instrument, the labyrinth cover of the invention has the additional advantage of protecting the counting chamber 18 from dirt or debris which might accidentally fall through the elevator shaft 26 from above. This prevents a sample from being manually inserted or removed directly from the load-unload station 25, but with modern control apparatus, the sample conveyor may still be easily manipulated by the operator to handle an individual sample vial 20 for counting. A particular sample station 40 can be marked or otherwise indicated on the surface of the feeder table 10. This station 40 is fixed at a predetermined number of chain links away from the load-unload station 25, so by automatically indexing the drive sprockets 12 by the predetermined number of links corresponding to the displacement of the sample station 40 from the load-unload station 25, a particular sample placed in that station can be automatically brought to the load-unload station and thence transferred to the counting chamber 18. When counting is completed the sample is removed in the same manner, and delivered to the opposite side of the feeder table for manual removal.

We claim:

1. In a scintillation counter having an internal scintillation counting chamber and continuously energized scintillation detection means, a load-unload station, and sample changing means for transferring a sample vial through a straight line passage between said load-unload station and said counting chamber, the improvement comprising in combination:

path defining means for guiding a sample vial to and from said load-unload station, said path defining means defining a serpentine path with respect to said load-unload station, said path having at least one reversal of path direction on both advancing to and withdrawing from said load-unload station;

said path defining means including a plurality of drive sprockets spaced in staggered array and a continuous chain looped between said drive sprockets and drivingly engaged thereby, said chain comprising a plurality of articulated link sections in which each section includes an opaque shroud means for receiving a sample vial;

sample, indexing means for indexing said vial along said path into position for engaging said sample changing means at said load-unload station; and a lighttight cover enclosing said serpentine path, said cover having tunnel defining internal panels defining a folded lighttight serpentine tunnel having at least one complete reversal of direction on both advancing to and withdrawing from said load-unload station, whereby direct passage of ambient light into said load-unload station is blocked.

2. The improvement defined in claim 1 in which said tunnel defining panels of said cover means have a light absorbing coating.

3. The improvement defined in claim 2 in which said cover means is carried by said scintillation counter and a separation plane is defined therebetween, and in which said tunnel defining panels include flexible light seals at said separation plane.

4. In a liquid scintillation counter having an internal lighttight counting chamber, a load-unload station, and sample changing means for transferring a sample vial through a straight line passage between said load-unload station and said counting chamber, the improved method of indexing a light transmissive sample vial containing a radioactive isotope and a liquid scintillator comprising the steps of:

positioning said sample vial within an opaque shroud means at one of a plurality of sample positions on a movable sample conveyor;

conveying said sample vial in stepwise seriatim order through an elongate lighttight serpentine tunnel to said load-unload station;

transferring said sample vial from its shroud means on said conveyor at said load-unload station to said counting chamber;

counting the number of scintillations in said sample vial during a predetermined time period;

returning said sample vial from said counting chamber to its said shroud means on said conveyor; and conveying said sample vial away from said load-unload station through an elongate lighttight serpentine tunnel in a stepwise seriatim fashion.

5. A method as defined in claim 4 in which said conveyor is caused to make a reversal of direction within said lighttight tunnel prior to the arrival of said sample vial at the load-unload station, and in which said conveyor is caused to make a reversal of direction within said lighttight tunnel in conducting said sample vial away from said load-unload station through said lighttight tunnel prior to emerging therefrom.